(12) United States Patent
Xu et al.

(10) Patent No.: US 8,428,984 B2
(45) Date of Patent: Apr. 23, 2013

(54) TRANSFORMING SERVICE ORIENTED ARCHITECTURE MODELS TO SERVICE ORIENTED INFRASTRUCTURE MODELS

(75) Inventors: Zhi Jiong Xu, Karlsruhe (DE); Thomas Mann, Karlsruhe (DE); Christian Reimsbach Kounatze, Paris (FR)

(73) Assignee: SAP AG, Walldorf (DE)

( * ) Notice: Subject to any disclaimer, the term of this patent is extended or adjusted under 35 U.S.C. 154(b) by 591 days.

(21) Appl. No.: 12/550,405

(22) Filed: Aug. 31, 2009

(65) Prior Publication Data
US 2011/0054962 A1 Mar. 3, 2011

(51) Int. Cl.
*G06Q 10/00* (2006.01)
(52) U.S. Cl.
USPC ............................................................ 705/7.11
(58) Field of Classification Search .................. 705/7.11
See application file for complete search history.

(56) References Cited

U.S. PATENT DOCUMENTS

| | | | |
|---|---|---|---|
| 7,020,697 B1 * | 3/2006 | Goodman et al. | 709/223 |
| 7,225,176 B2 * | 5/2007 | Atamer | 706/46 |
| 7,584,282 B2 * | 9/2009 | Reeves et al. | 709/226 |
| 7,707,015 B2 * | 4/2010 | Lubrecht et al. | 703/6 |
| 7,822,594 B2 * | 10/2010 | Haviv et al. | 703/21 |
| 7,971,231 B2 * | 6/2011 | Gupta et al. | 726/1 |
| 2006/0288149 A1 * | 12/2006 | LaVigne et al. | 710/306 |
| 2009/0063171 A1 | 3/2009 | Isom | |
| 2009/0132211 A1 * | 5/2009 | Lane et al. | 703/2 |
| 2009/0132708 A1 * | 5/2009 | Hayward | 709/226 |
| 2009/0164497 A1 * | 6/2009 | Steinmaier et al. | 707/102 |
| 2010/0198971 A1 * | 8/2010 | Callaway et al. | 709/226 |
| 2011/0004499 A1 * | 1/2011 | Zhang et al. | 705/7 |
| 2011/0029479 A1 * | 2/2011 | Novak et al. | 707/610 |

FOREIGN PATENT DOCUMENTS

| | | |
|---|---|---|
| EP | 1693765 A2 | 8/2006 |
| WO | WO 2008/008118 A2 | 1/2008 |

OTHER PUBLICATIONS

Enrique Castro-Leon, et al., "Service Orchestration of Intel-Based Platforms Under a Service-Oriented Infrastructure," 10 Intel Technology Journal 265-274 (2006).*
The Open Group, "Service Oriented Infrastructure Reference Framework" (Apr. 2009).*
Smyth, Barry; Cunningham, Padraig; Keane, Mark. "Hierarchical Case-Based Reasoning: Integrating Case-Based and Decompositional Problem-Solving Techniques for Plant-Coltrol Software Design". 1997.*
Smyth, Barry; Cunningham, Padraig. "Deja Vu: A Hierarchical Case-Based Reasoning System for Software Design". 1992. Proceedings of 10th European Conference on Artificial Intelligence.*
European Search Report for EP Application No. 10008704.8-2201, mailed Dec. 1, 2010, 11 pages; EPO, Munich, Germany.
Schmidt D et al.; Pattern-Oriented Software Architecture; Patterns for Concurrent and Networked Objects vol. 2; Jan. 1, 2000; John Wiley & Sons Ltd., Chichester, England; (http://as.wiley.com/WileyCDA/WileyTitle/productCd-0471606952.html).

(Continued)

*Primary Examiner* — Romain Jeanty

(57) ABSTRACT

Described herein are methods and systems for SOA to SOI transformation. The transformation is performed by a transformation engine, driven by a transformation algorithm. A "used case database", to provide the current know-how information for such transformations, and a "performance database", to describe new hardware parts with more powerful metrics are incorporated into the transformation algorithm. In addition, a business engine supports the transformation engine with business analyzing features using a "business value database".

16 Claims, 14 Drawing Sheets

OTHER PUBLICATIONS

Buschmann et al.; Pattern-Oriented Software Architecture; A System of Patterns, vol. 1; Dec. 31, 1996; John Wiley & Sons Ltd., Chichester, England; (http://as.wiley.com/WileyCDA/WileyTitle/productCd-0471958697.html).

Shubhashis Sengupta, Hariprasad Nellitheertha and Srikanth Sundarrajan; Service Oriented Infrastructure; SETLabs Briefings; Jan.-Mar. 2007; vol. 5 No. 1; Infosys Technologies Ltd.; Bangalore, India (http://www.infosys.com/research/publications/SETLabs-briefings-SOA.pdf).

Arne-Jørgen Berre et al.; SAMBA—An Agent architecture for Ambient Intelligence Elements Interoperability; Presented at 3rd International Conference I-ESA (Interoperability for Enterprise Software and Applications) 2007 (Mar. 26-30, 2007), Funchal (Madeira Island), Portugal (http://www.dcs.bbk.ac.uk/~dimarzo/papers/IESA07.pdf).

NESSI Strategic Research Agenda; Strategy to Build NESSI vol. 2; Dec. 10, 2007; Review Draft 2.1—Version Dec. 3, 2007; NESSI; San Francisco, California, USA (http://www.nessi-europe.eu/Nessi/Portals/0/Nessi-Repository/SRA/Documents/SRA_Vol2_20071209_GA_2.pdf).

FlexFrame Infrastructure—The Platform for a Dynamic Business; 2007; Fujitsu Siemens Computers; Munich, Germany (http://se.ts.fujitsu.com/Resources/118/106115764.pdf ).

Fusion Dynamic; Beyond Virtualization: New Operating Environment Offers First True Service-Oriented Infrastructure for Data Centers; Roeder-Johnson Archives; Sep. 6, 2006; Roeder-Johnson Corporation; California, USA (http://www.roeder-johnson.com/RJDocs/FUbeyondvirtualization0906.html).

Budi Darmawan et al.; IBM Tivoli Composite Application Manager Family Installation, Configuration, and Basic Usage; Jan. 2008; pp. 28-29, 30-31, 44-45, 472-482; IBM Corp. (http://www.redbooks.ibm.com/redbooks/pdfs/sg247151.pdf).

* cited by examiner

TRANSFORMING SERVICE ORIENTED ARCHITECTURE MODELS TO SERVICE ORIENTED INFRASTRUCTURE MODELS

FIELD OF THE INVENTION

The invention relates to transformation of a Service Oriented Architecture (SOA) model into a Service Oriented Infrastructure (SOI) model. More precisely, the invention relates to a transformation method to accomplish the SOA to SOI transformation.

BACKGROUND OF THE INVENTION

For businesses to drive the changes in Information Technology (IT) and not be limited by it, the full potential of Service Oriented Architecture (SOA) needs to be harnessed in addition to determining flexible and dynamic interoperability between service applications and the corresponding IT infrastructure, on which the applications will finally be deployed and run. SOA provides highly flexible and scalable service applications, but only if the underlying IT hardware infrastructure can meet the changing needs and requirements in the same flexible manner. Taking current systems into account, the IT infrastructure has turned out to be a bottle neck. This led to Service Oriented Infrastructure (SOI) which allows for IT infrastructure to be defined as a service. In SOI, virtualization is applied to realize flexibility and scalability by treating IT infrastructure as services representing a pool of resources (e.g., web servers, application servers, database servers, servers and storage instances).

SUMMARY OF THE INVENTION

A computerized method and system for SOA to SOI transformation are described herein. In one embodiment, the method includes receiving a SOA model instance and detecting patterns in the SOA model instance that are transformable according to one or more used cases of a database comprising used cases of previously transformed patterns. The method also includes transforming the detected patterns, thus creating intermediate states model instances and selecting a best SOI model instance through dynamic performance and business data analysis.

In another embodiment of the invention, the system includes a memory having stored instructions related to a transformation engine operable to transform a SOA model to a SOI model and a business engine operable to support the transformation engine with sophisticated business analyzing features. The system also includes a processor to execute the instructions in the memory related to the transformation engine and the business engine, and a used case database to provide a set of known transformable patterns for the SOA to SOI transformation. The transformation engine is also supported by a performance database to provide properties of available hardware parts for the SOI model and a business value database, comprising historical information, cost facts and efficiency data for business analyzing features.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

SOA models describe software based services. This leads to a complete, abstract, non-physical representation of the service with all its software components, interfaces and implementation details. Some exemplary SOA model aspects and scopes include service description; service bindings; dependencies between services; service properties; topology of the service; service components; internal component dependencies of a service; component properties; component topology; recursive component modeling; aspects of implementation; and aspects of deployment. An example of a SOA model language that incorporates these scopes is the Service Component Architecture (SCA).

In a SOI model, the goal is to describe a physical based computer infrastructure with all physical based aspects of deployed computer parts and links. In addition to these points, a SOI model has to describe other aspects such as installed software and network topology. Some exemplary SOI model aspects and scopes include: hardware parts and their locations; network parts and topology structure of the network; devices and functionality of hardware parts; installed applications, software parts and services; systems (represented as a top level model object consisting of hardware, network, etc.); and metrics of described systems and elements. An example SOI model language that incorporates these scopes is the Common Information Model (CIM).

Figure 1:
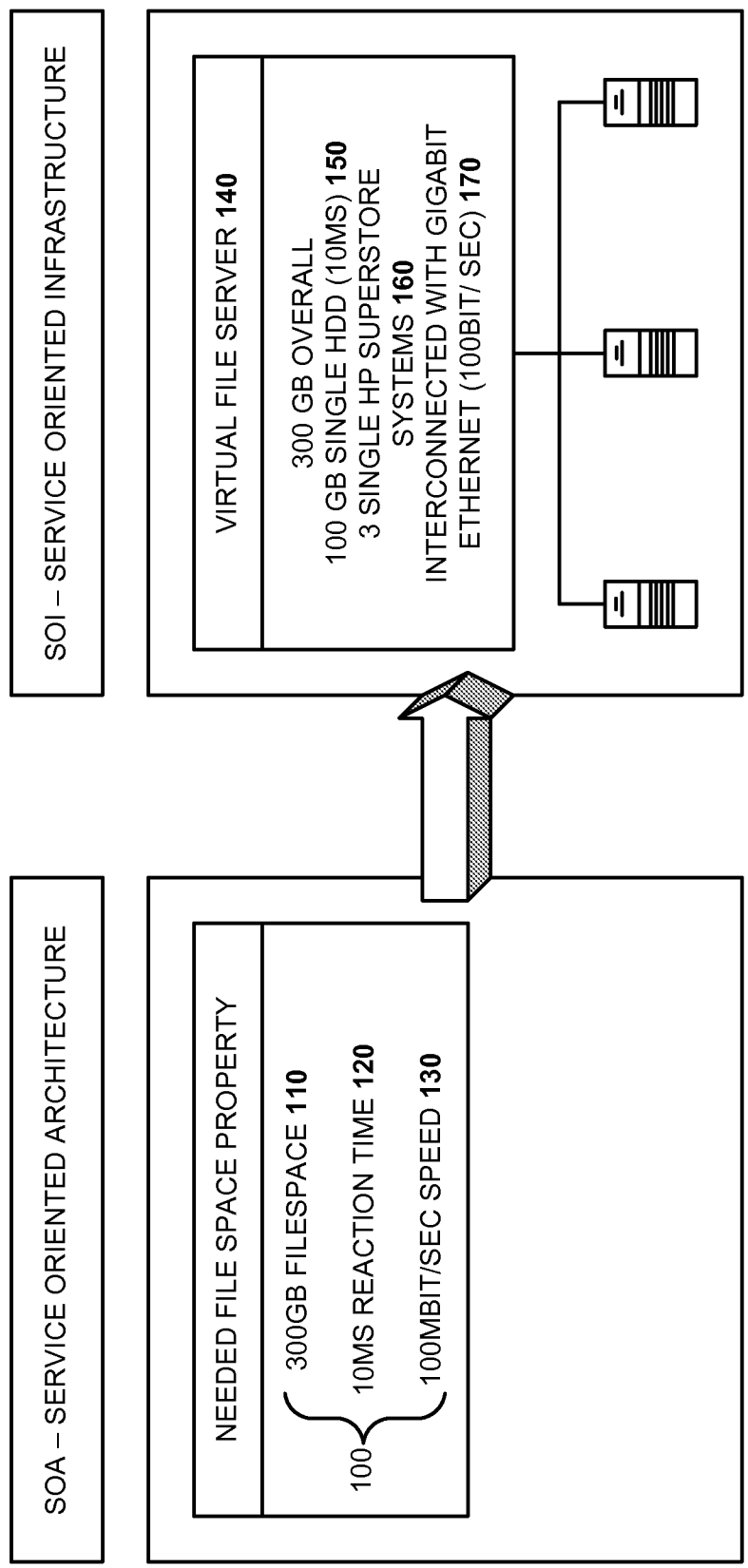
FIG. 1 is a block diagram with an exemplary illustration of SOA to SOI property transformation method.

According to one embodiment, a SOA model describes a software based service. For instance, in a SOA model, a software based service is represented by the functionality of its components, interfaces, and implementation details. Typically there is nothing physical in such a model and the representation is completely abstract. For example, in FIG. 1, the properties 100 of a SOA model are described in part as requirements: 300 GB Filespace 110; 10 msReaction time 120, and 100 MBit/sec speed 130. In contrast, a SOI model describes a physical based computer infrastructure with all the necessary hardware parts. So, a SOI model represents the hardware needed to implement a SOA model. In the example of FIG. 1, the properties 100 are transformed into a virtual file server 140, comprising 3 single Hewlett Packard superstore systems 160, each with 100 GB hard disk and 10 ms reaction time 150, the systems connected with 100 MBit/sec Gigabit Ethernet 170. This is an example for SOA to SOI transformation, where the service requirements (e.g., 100) are implemented into hardware parts (e.g., 140). In addition to hardware parts, a SOI model describes other aspects such as installed applications, software parts and services but not in the manner the services are described in a SOA model but rather as a part of the hardware infrastructure necessary to implement the SOA service.

Figure 2:
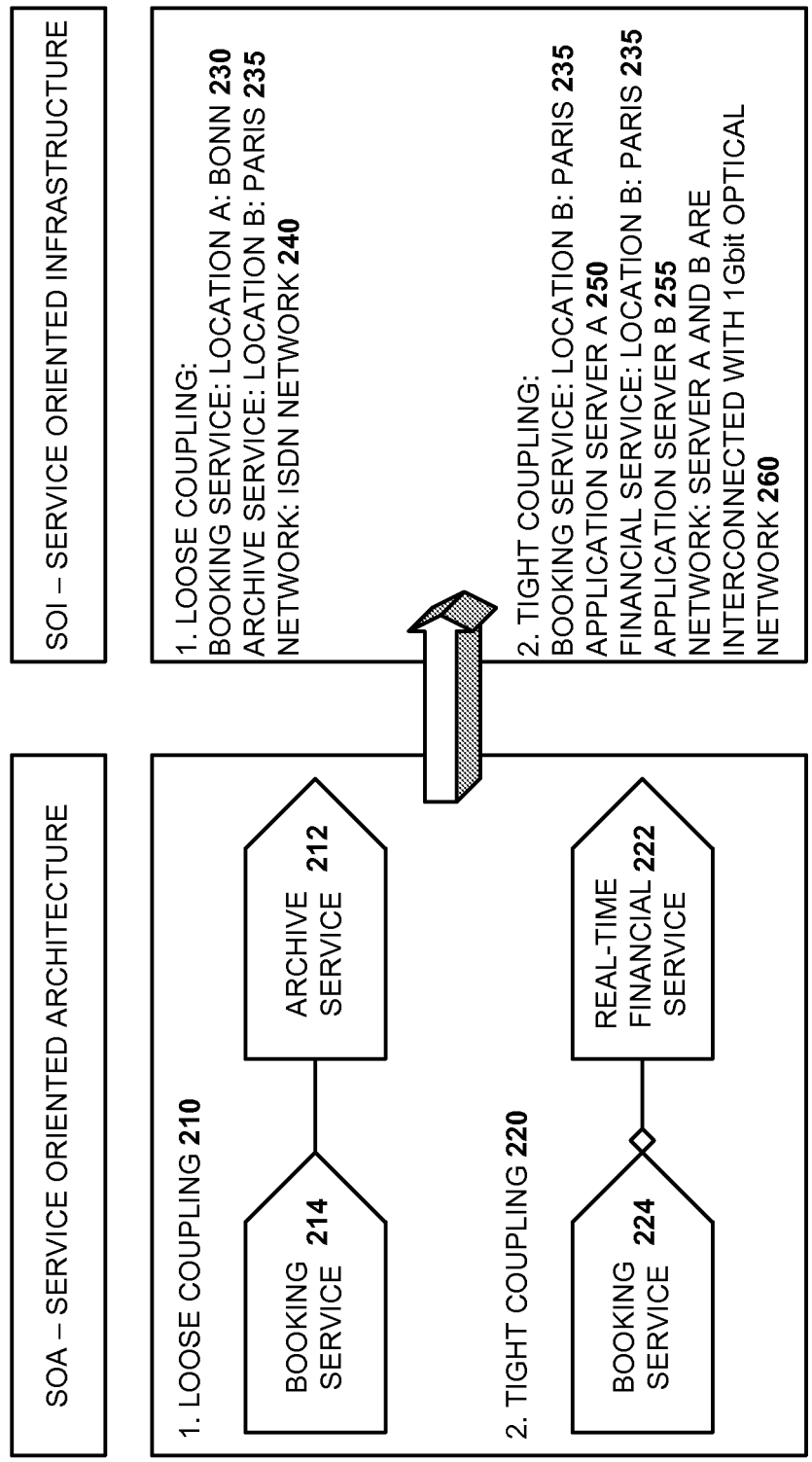
FIG. 2 is a block diagram with an exemplary illustration of SOA to SOI inter-service transformation method.

The example in FIG. 2, illustrates a request of a business process, which is made up of different services (e.g., 212, 214, 222, and 224), wherein the relationship between the services of the process affects the transformation from SOA to SOI. The definition of the relationship between services is dependent on the business process and its configuration as driven by business needs. One such relationship is the level of coupling between services (e.g., some measure of their interdependency) which in one embodiment as shown in FIG. 2 can be defined as loose coupling or tight coupling. Tight coupling 220 means, for instance, two adjacent services have strong dependencies. For example, the real-time financial service 222 should be processed instantly after the booking service 224. This implies a high communication requirement including bandwidth and speed. On the contrary, loose coupling 210 means there is no strong dependency between the services such as the archive service 212 could be invoked only twice a year after the booking service 214.

Such relationships between services of a business process may be described in an assembly diagram of the SCA. Thus, the relationship of the services can be one among many factors described in further detail below that influence the transformation into the corresponding infrastructure component. For the example presented in FIG. 2, the services that have loose coupling may be run in different locations, for example Bonn 230 and Paris 235 and only an ISDN network 240 is necessary to connect the two locations. The tight coupling presumes the two services 222 and 224 should be combined at one location, for example Paris 235, although run at different application servers A 250 and B 255. A high speed connection like a 1 Gbit optical network 260 is needed to fulfill the requirement for high communication bandwidth and speed between the application servers A 250 and B 255.

Figure 3A:
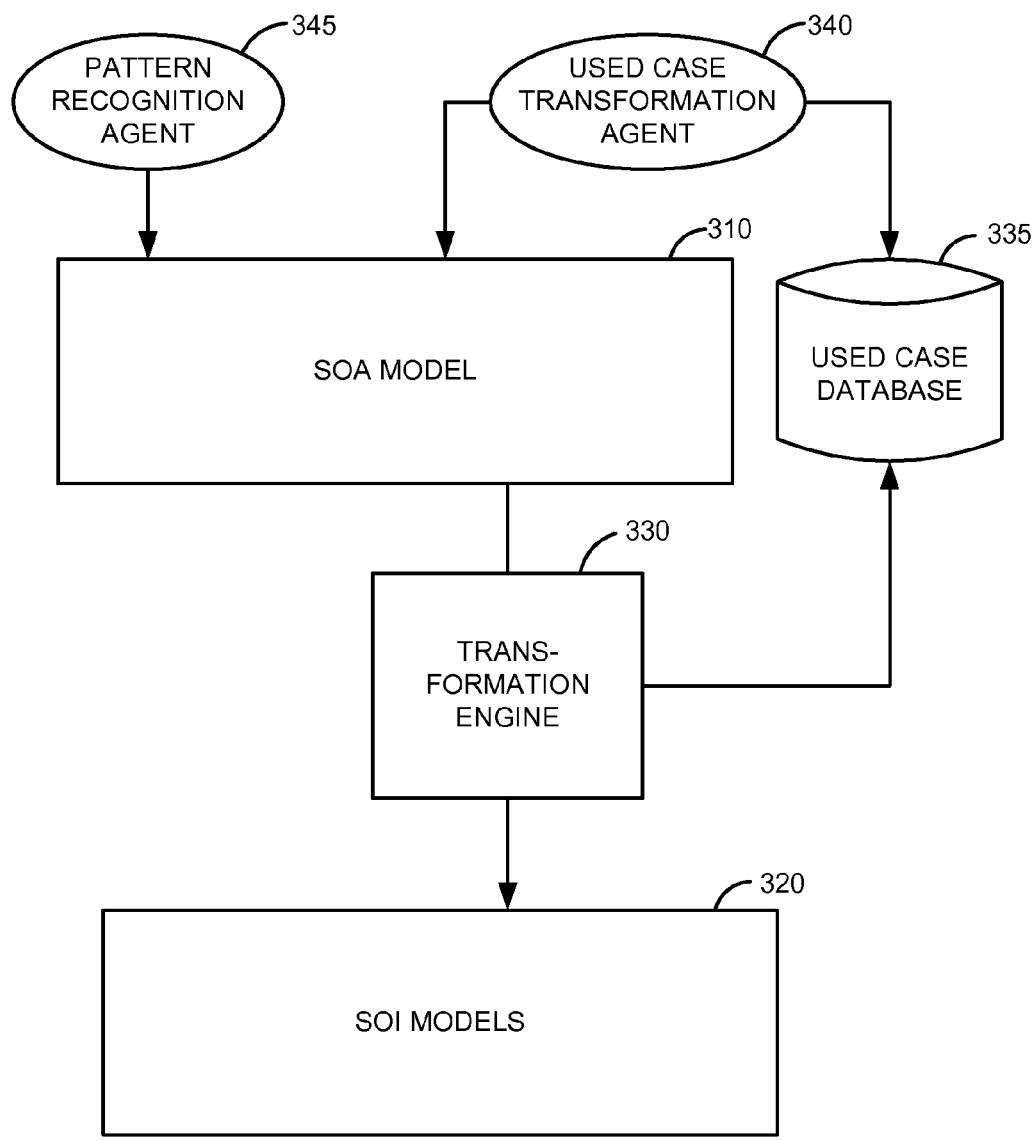
FIG. 3a is a block diagram representing exemplary schematic system architecture for SOA to SOI transformation according to an embodiment of the present invention.

FIG. 3a represents exemplary schematic system architecture for implementing SOA to SOI transformation according to one embodiment of the present invention. The system includes a SOA model 310, SOI models 320, a transformation engine 330, and a used case database 335. According to one embodiment, the transformation engine 330 uses previously solved transformation instances to determine an appropriate transformation for current transformation request. The transformation engine 330 uses the "used cases" from the used case database 335. Used cases provide the SOA to SOI transformation solution to a certain pattern, which is a part of a complete SOA or SOI model.

A pattern can be an aspect or a component of a SOA or a SOI model. For instance, patterns can include dependencies between services, service components, internal component dependencies of a service, hardware parts and their location, network parts and topology structure of a network, devices and functionalities of hardware parts. A pattern may be transformed by one or more used cases. Thus, several used cases may transform a single pattern in various ways. These various ways define alternative transformations to the same single pattern. Transforming this same single pattern according to all possible alternative transformations leads to different intermediate state model instances.

Figure 3B:
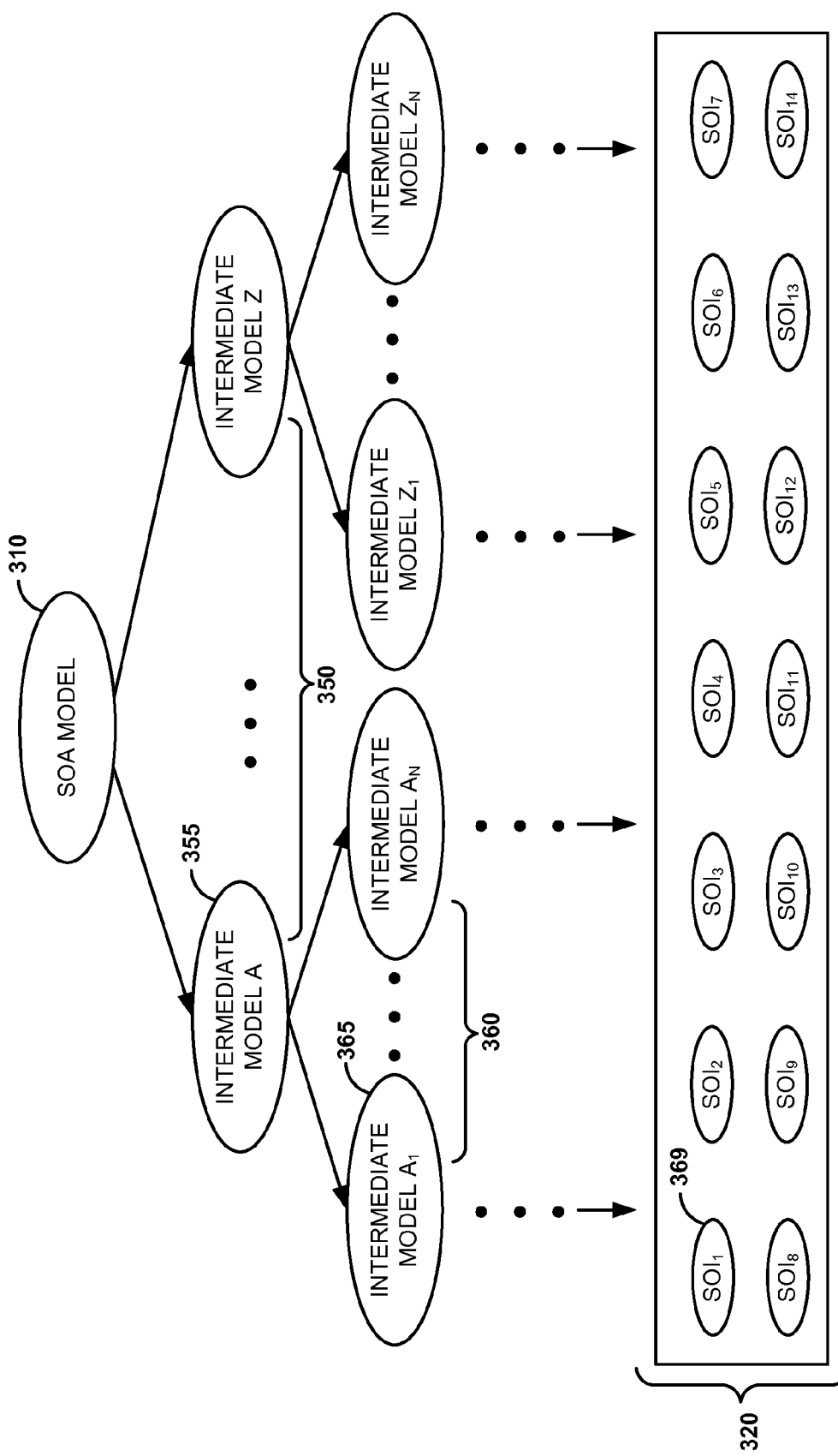
FIG. 3b is a block diagram representing an exemplary SOA to SOI transformation including intermediate states according to an embodiment of the present invention.

For example, a pattern from the SOA model instance 310 in FIG. 3b is transformed according to all present used cases for such pattern, thus creating intermediate state model instances 350. Further, every intermediate state model instance is branching into other lower intermediate state model instances. For example, the intermediate state model instance 355 is further transformed into lower intermediate state model instances 360 that again may be transformed to lower intermediate state model instances and this process continues until no more patterns may be transformed and a pool, comprising a finite number of possible SOI models 320, is created. The pool provides all possible transformations of the SOA model 310. The number of SOI models 320 in the pool depends on the available "used cases" for transforming patterns in the used case database 335.

The more used cases exist in the used case database 335 for transforming a pattern, the more intermediate state model instances may be created and thus the more SOI models 320 may be created. There might be a situation, where there is only one possible transformation of the SOA model 310. An example of such transformation might be the transformation presented in FIG. 1. For the service requirements (e.g. 100), only one possible set of hardware infrastructure (e.g. 140) is proposed. In this case there is only one instance in the SOI models 320 and this instance is the virtual file server 140 with its components 150, 160, and 170. In the case of more than one solution of the SOA model 310, the alternative transformations in transforming, for example, a service requirement for 500 terabyte of network traffic may be accomplished by different hardware components with the same characteristics but produced by different manufacturers. Similarly, a service requirement for 300 GB filespace may be realized either by one 300 GB hard disk or several hard disks with total capacity equal to or more than 300 GB.

Turning back to FIG. 3a, in one embodiment, the used cases are kept for future reuse in the used case database 335. The transformation is thus based at least in part on pattern recognition of known "used cases" and transforming these patterns by the transformation engine 330. The transformation engine 330 uses the used case database 335, which serves the transformation. Thus new approaches and facts on SOA or SOI level may be incorporated into the used case database 335, updating and improving the used case database 335 with new solutions concerning newer transformation aspects and problems, which have not yet been solved.

Figure 4:
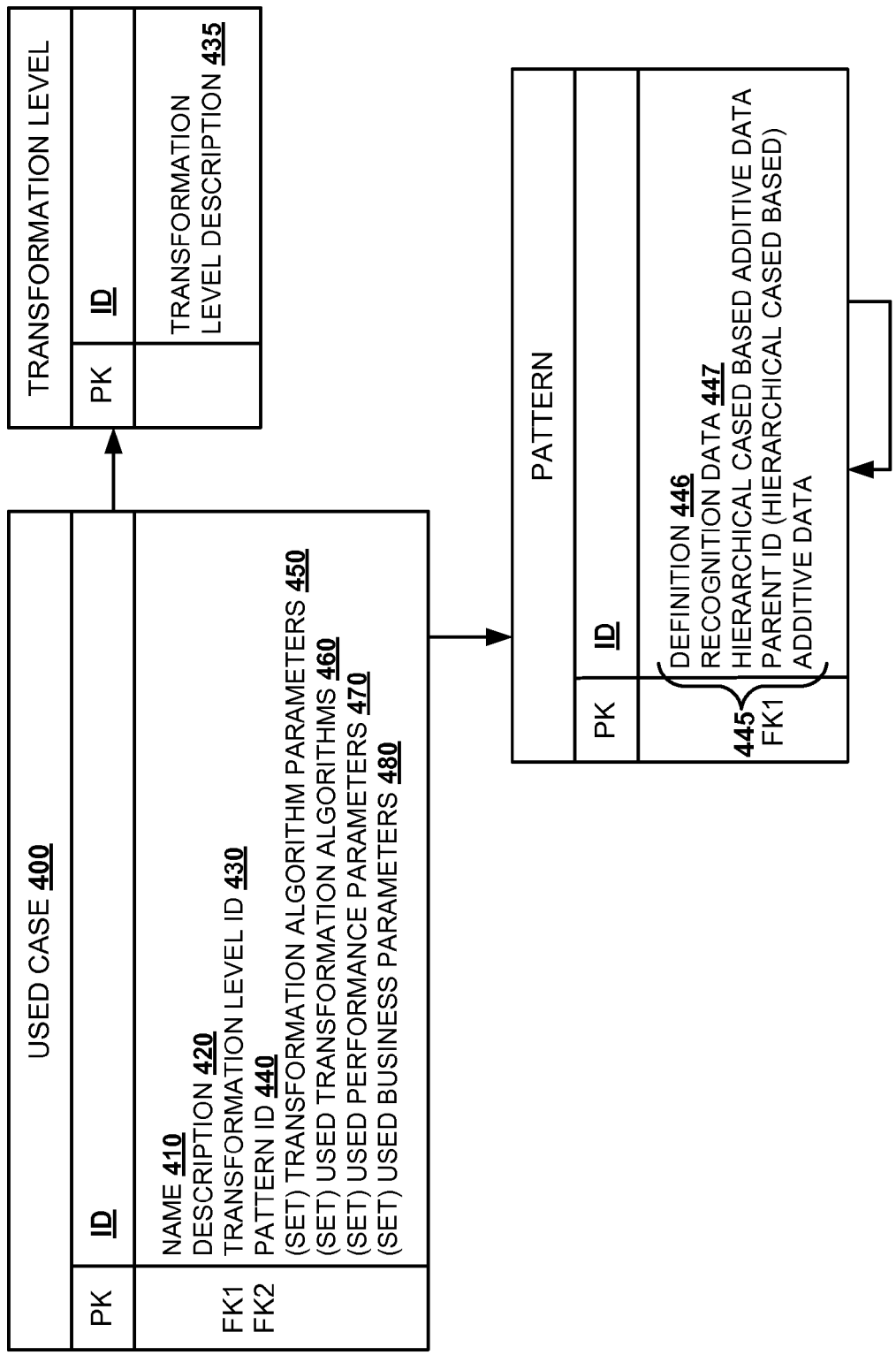
FIG. 4 is an entity relationship diagram for an exemplary design of a used case database.

The entity-relationship (ER) diagram presented in FIG. 4 illustrates one exemplary implementation of the used case database 335. A used case 400 may include the name 410 and a brief description 420 of the used case 400. Additional details (e.g., transformation level ID 430) can be added to describe one or more attributes of the transformation associated with the used case including representation of the relationships, properties and objects and/or classes of the service being transformed that were taken into account when executing the transformation. The pattern that represents the used case can be defined in part by a pattern ID 440. In addition, different transformation algorithm parameters 450, used transformation algorithms 460, used performance parameters 470, and used business parameters 480 may be set. All these set parameters and algorithms characterize the used case 400 and the transformation it describes. The used transformation algorithms 460 may be, for example, scripts, calculi, or small software pieces that transform the pattern 440. The different transformation algorithm parameters 450, used performance parameters 470 (e.g., response time, error rate, etc), and used business parameters 480 (e.g., cost calculations) may be all used as variables in the transformation algorithms. The alteration of the parameters would trigger different transformation outcomes for a single pattern. These different transformation outcomes are exactly the transformation alternatives that were also called intermediate state model instances 350 and 360 in connection to FIG. 3b. Further, information 445 may be present for the pattern 440 like pattern definition 446 and recognition data 447. Because in one embodiment the pattern recognition is performed at levels, transformation level information 435 may also be present.

Turning back to FIG. 3a, in one embodiment, a used case transformation agent 340 is responsible for transforming a single pattern. In one embodiment, a pattern recognition agent 345 may be used to recognize patterns of the SOA model 310. In one embodiment, the pattern recognition agent 345 uses pattern recognition methods based on hierarchical case-based reasoning. Since the transformation is performed in parts for certain patterns and not at once for a whole model, according to the hierarchical case-based reasoning approaches it is determined which pattern of a whole model is to be searched for first and eventually transformed, if present.

Figure 3C:
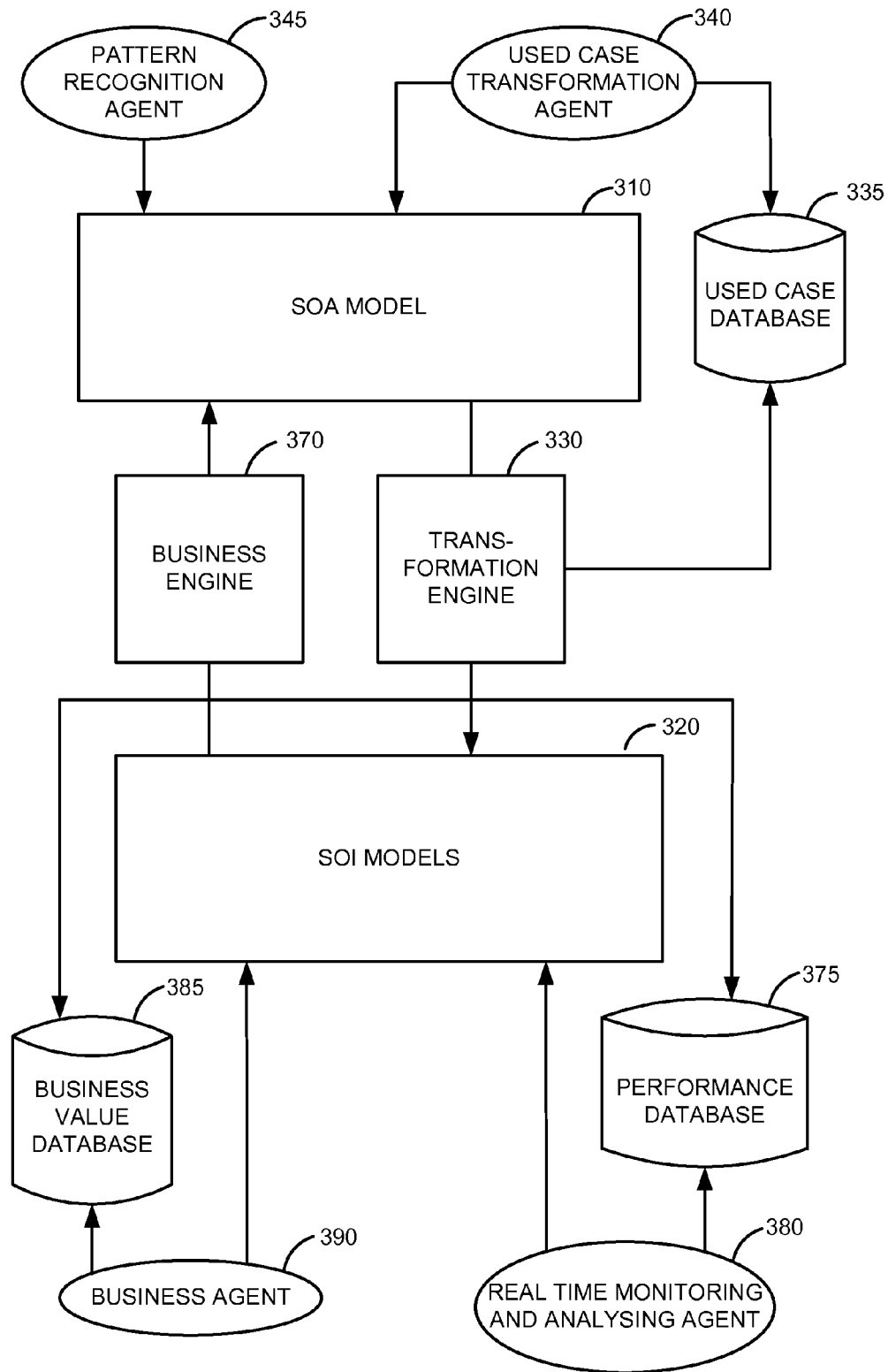
FIG. 3c is a block diagram representing exemplary schematic system architecture for SOA to SOI transformation according to an embodiment of the present invention.

Some of the parameters, which could change the transformation results, are the used performance parameters 470 and used business parameters 480. In one embodiment, these parameters are incorporated respectively in a performance database 375 and a business value database 385, as presented in FIG. 3c. In one embodiment, both these databases are used by a business engine 370. The business engine 370 enriches the SOA model with performance and business facts. The performance database 375 provides, through the performance parameters 470, current state of the art hardware parts and their specific metrics, which are able to influence the specific pattern transformation algorithms. The business value database 385 provides, through the business parameters 480, business analysis data based on historical information, cost facts and efficiency data used for business analyses. This enables the transformation algorithm to provide a more business oriented transformation.

In some embodiments, a real time monitoring and analyzing (RTMA) agent 380 provides continuous monitoring of the SOI models 320 and their separate components derived from the transformation engine 330. Thus, the RTMA agent 380 dynamically examines the SOI models 320 and their components and at the same time produces data for the performance database 375 that is used by the business engine 370 and the transformation engine 330. The RTMA agent 380 is also possible to perform bottleneck analysis based on the monitoring information. In SOI sense, bottleneck analysis comprise information for the work load and hence the performance of the components of a SOI model. In one embodiment, a business agent 390 examines the SOI models 320 and provides business data such as bottleneck analysis reports or cost reports to ensure the SOI components will meet the requirements and the restrictions of a Service Level Agreement (SLA). According to one embodiment, a service-level agreement (SLA) is a negotiated agreement between two parties where one is the customer and the other is the service provider. The SLA may specify the levels of availability, serviceability, performance, operation, or other attributes of the service such as billing. Such information is collected by the business agent 390 and maybe stored in the business value database 385.

In some embodiments, the business engine 370, together with the business agent 390 and the RTMA agent 380 with their dynamic analysis, reduce the SOI models 320 to only one SOI model, which is the best one to meet the concurrent performance and business requirements and restrictions.

Figure 5:
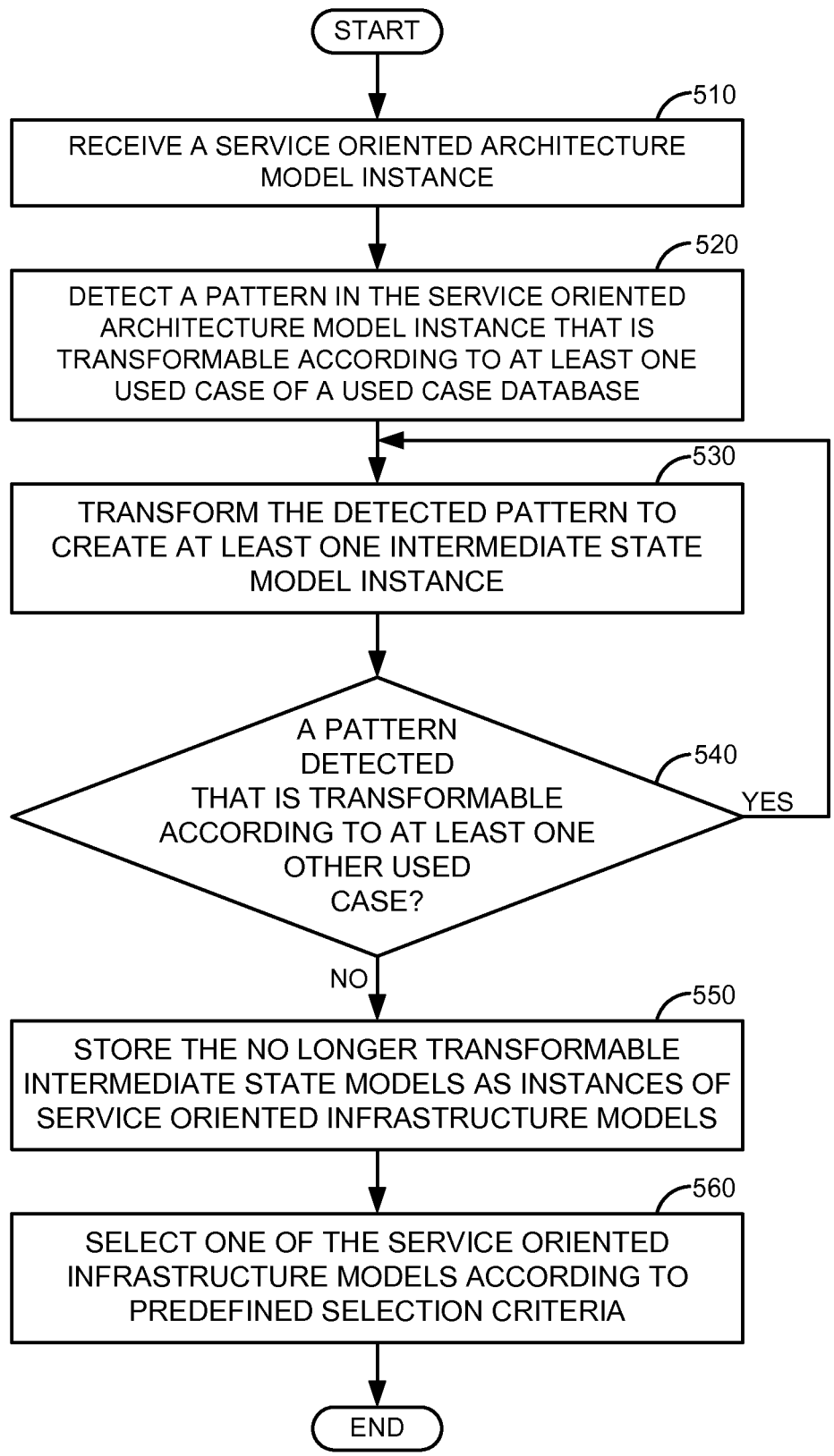
FIG. 5 is a flow diagram describing an exemplary SOA to SOI transformation method according to an embodiment of the present invention.

FIG. 5 represents a flow diagram describing an exemplary SOA to SOI transformation method. The transformation starts with receiving a SOA model instance at block 510. At block 520, a pattern in the SOA model instance is detected that is transformable according to at least one used case of a used case database. The used case database comprises one or more used cases of previously transformed patterns. Thus the used cases provide solutions to certain patterns, which are parts of a complete model. The used cases that may transform a certain pattern are called applicable for this pattern. In one embodiment, the detection of a pattern is performed at transformation levels to recognize patterns. In one embodiment, there are four transformation levels to recognize patterns. The first level may be the property transformation level. On this level, each SOA property or SOA object or instance is transformed to the corresponding property of the SOI components or artifacts, as in the example of FIG. 1. The second level may be the object or class transformation level. At this point, SOA components and elements are transformed with all or a subpart of their properties to SOI. The third level may be the intra-service level. Through the analysis of the dependencies such as wires, interfaces and dependencies between components and software processes, a more sophisticated SOI design can be created during the transformation process.

Figure 7:
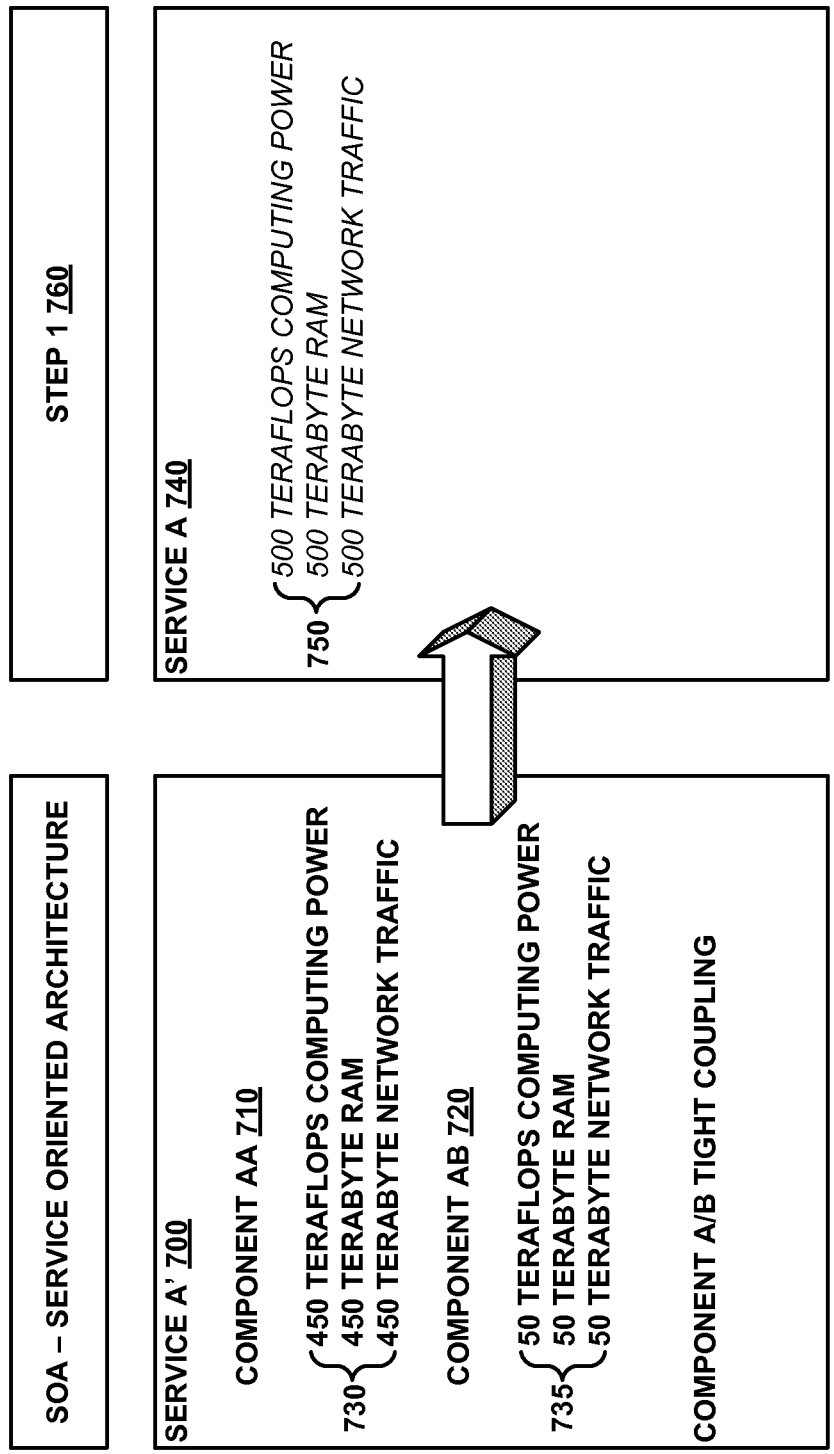
FIG. 7 is a block diagram representing a pattern recognition and transformation step of an entire example of SOA to SOI transformation method.
Figure 8:
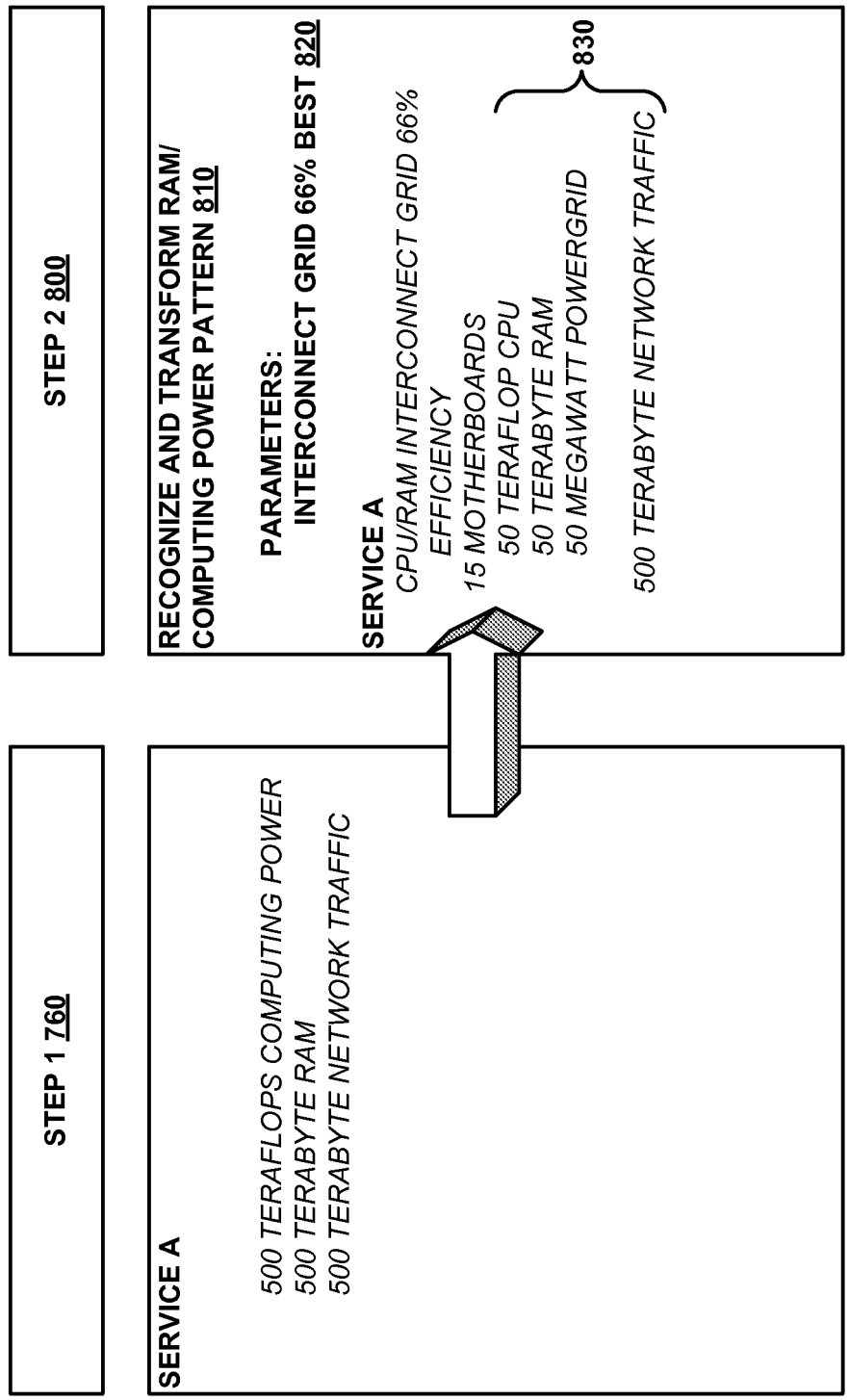
FIG. 8 is a block diagram representing a pattern recognition and transformation step of an entire example of SOA to SOI transformation method.

An example of intra-service dependency is presented in FIG. 7. Since there is tight coupling determined between component AA 710 and component AB 720 of service A' 700, the service A 740 of the updated SOI model consolidates the service requirements 730 of component AA 710 and the service requirements 735 of component AB 720 into service requirements 750. The fourth level may be the inter-service level. On this level, the dependencies between a set of services are analyzed. Therefore it is possible to recognize the relationship between services such as loose or tight coupling, the location of hardware parts of the SOI model and how the network between the hardware parts are structured, as the example in FIG. 2.

Turning again to FIG. 5, at block 530, the detected pattern is transformed according to the at least one used case and thus at least one intermediate state model instance is created. The applicable used cases differ from each other by the used transformation algorithms, transformation algorithm parameters, performance parameters, and business parameters. In one embodiment, the used performance parameters represent static performance data of available hardware parts for the at least one intermediate state model instances. In one embodiment, the business parameters are set depending on costs and benefits estimation. At block 540, a check is made for transformable patterns in the intermediate state model instances. If a transformable pattern is detected in block 540, which means there is at least one applicable used case in the used case database for this pattern, the pattern is transformed according to the at least one used case and thus one or more lower intermediate state model instances are created. The steps as described in blocks 530 and 540 for detecting and transforming patterns are executed iteratively until no more transformable patterns are found in the lower intermediate state model instances. At least one lower intermediate state model instance is created every time a pattern is transformed. At block 550, the no longer transformable lower intermediate state models are stored as instances of service oriented infrastructure models. Finally, at block 560, one of the service oriented infrastructure models is selected according to predefined selection criteria. In one embodiment the predefined selection criteria are based on dynamic performance and business data analysis. In one embodiment, the dynamic performance and business data analysis is based on real time performance information and on-demand reports such as bottleneck analysis reports and cost reports based on business value to support the selected SOI model instance to meet service level agreement restrictions and service level agreement requirements. Cost reports may contain information such as purchasing price, repair cost and earlier replacement cost of an infrastructure component.

Figure 6:
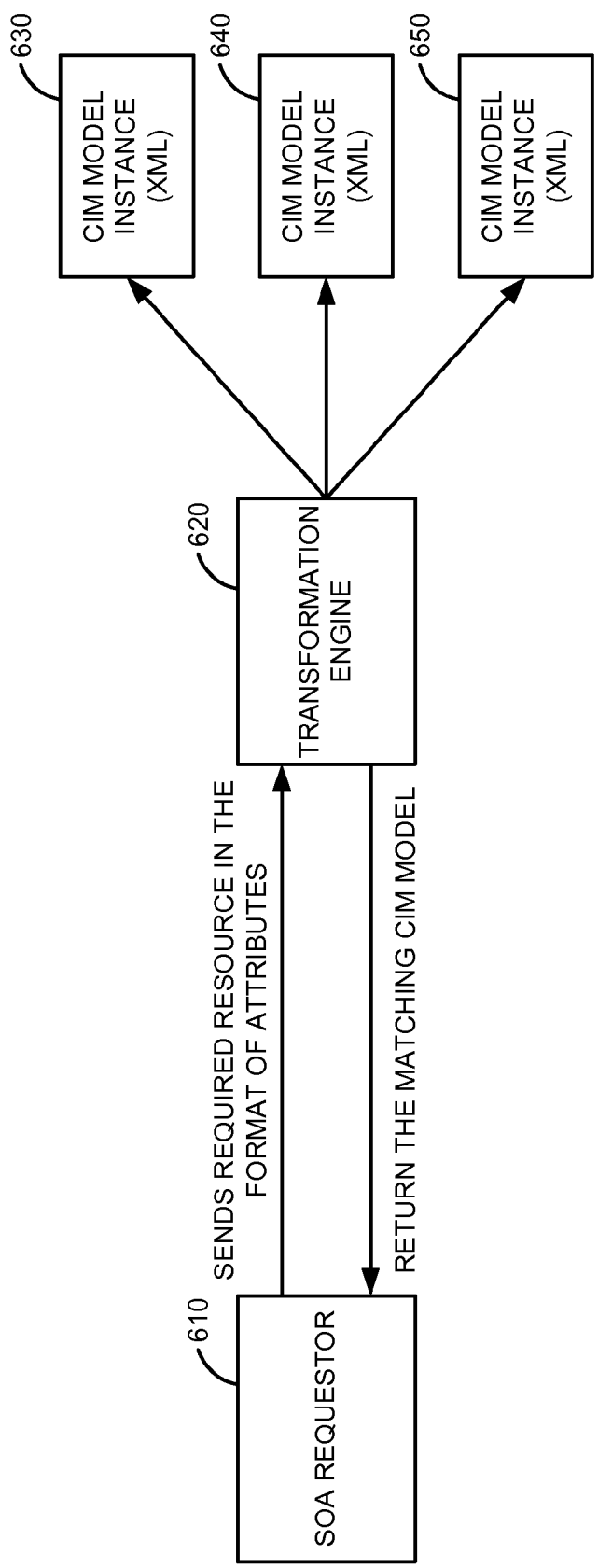
FIG. 6 is a block diagram with an exemplary illustration of a method of attribute mapping by SOA to SOI transformation.

In one embodiment, a match of a pattern is defined, as explained in connection to FIG. 6. FIG. 6 is a block diagram with an exemplary illustration of a method of attribute mapping by SOA to SOI transformation. From the side of SOA, the SOA requestor 610 sends a request to the transformation engine 620. The request of required resources is specified and sent in the format of attributes. On the side of the SOI, all the infrastructure components hosted in a resource pool could be modeled by the Common Information model (CIM), which is then described in the format of XML Schema (XSD). Thus, an infrastructure component could be described in an XML, an instance of the corresponding XSD. The attributes of the request received by the transformation engine 620 could be searched in the elements or attributes of XML that describe some infrastructure components like 630, 640, and 650 in FIG. 6, thus performing "attribute mapping" query on SOI level. In case certain attribute is matched, the corresponding infrastructure component is collected by the transformation engine 620. When all attributes are matched, the result is sent back to the side of the SOA.

Figure 9:
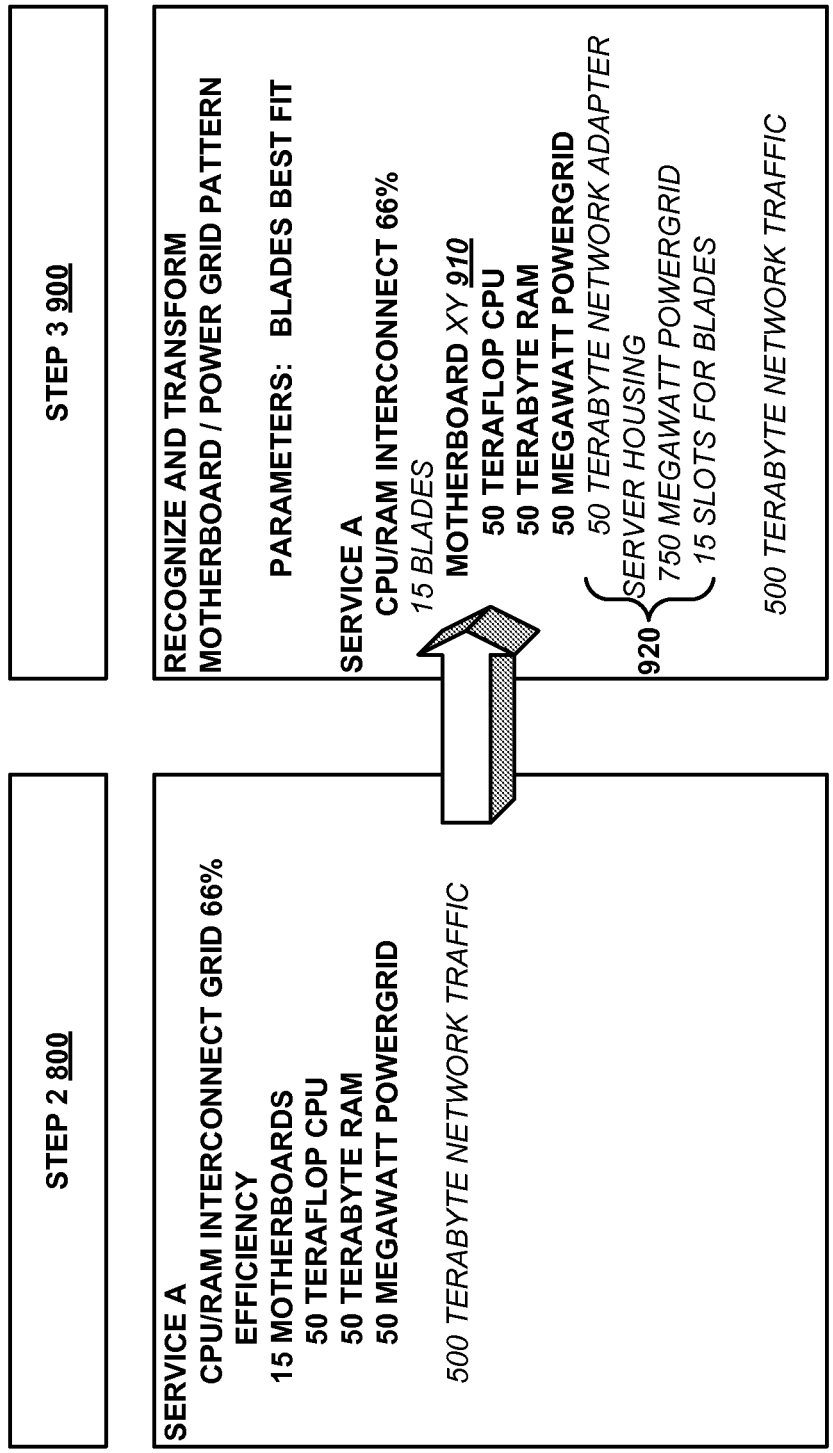
FIG. 9 is a block diagram representing a pattern recognition and transformation step of an entire example of SOA to SOI transformation method.
Figure 10:
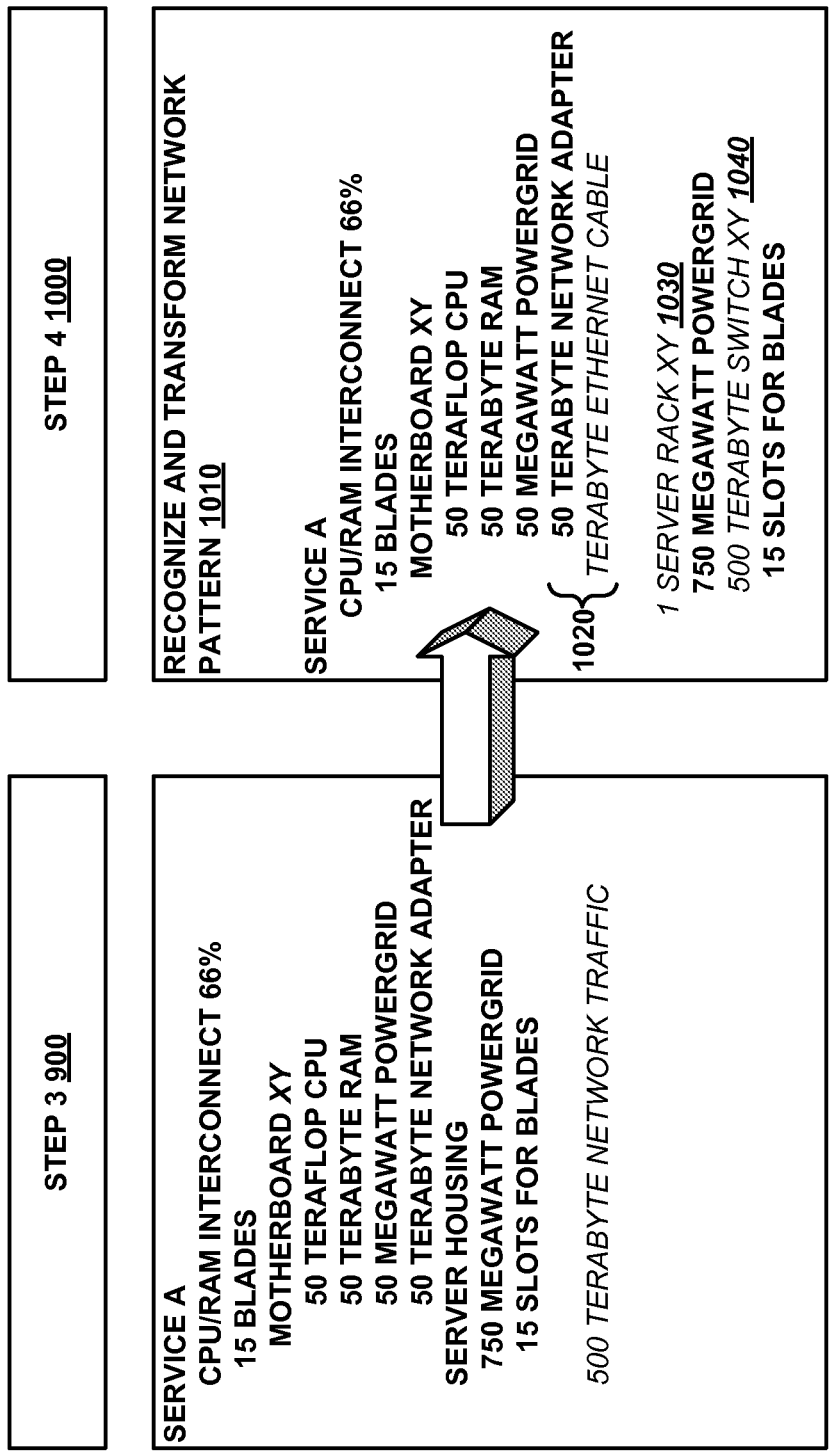
FIG. 10 is a block diagram representing a pattern recognition step and transformation of an entire example of SOA to SOI transformation method.
Figure 11:
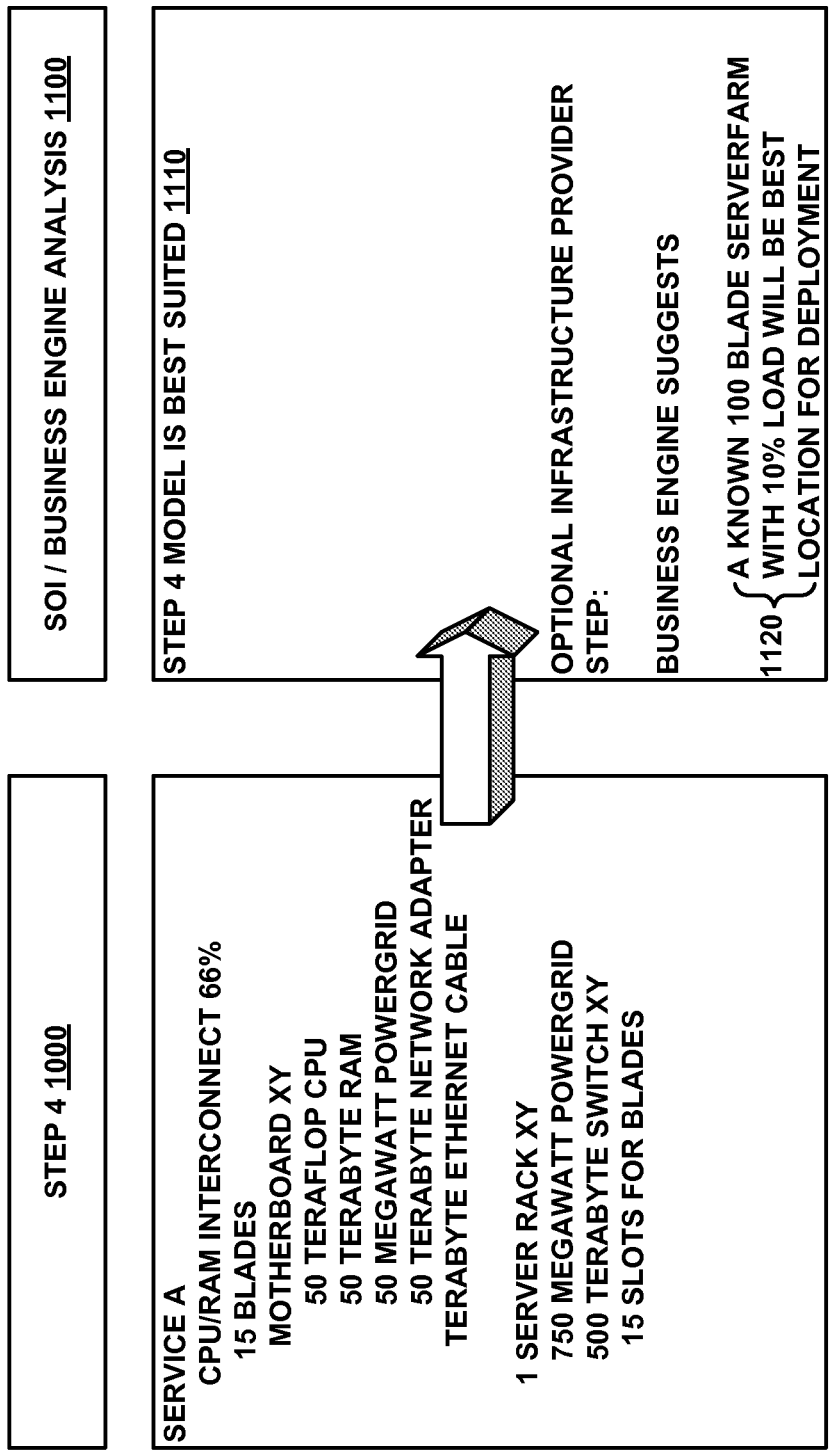
FIG. 11 is a block diagram representing a business engine analysis step of an entire example of SOA to SOI transformation method.

The exemplary transformation presented in FIG. 1 is performed at one step. This means there are no intermediate state models (e.g. 350 and 360, as explained in connection to FIG. 3b). In contrast, the transformation presented in FIGS. 7, 8, 9, 10, and 11 is performed at several steps. During these steps, some intermediate state model instances including some intermediate properties and objects are to be generated. These intermediate states model instances can be applied in other used case recognition patterns. Therefore, a multi step transformation is processed in a recursive way. At every accomplished step of transformation, a lower intermediate state model instance is created. This lower intermediate state model instance is further processed for known patterns until no more patterns are detected. FIGS. 7, 8, 9, 10 and 11 are block diagrams representing an entire example of SOA to SOI transformation according to the current invention. The process of transformation is divided into steps, showing intraservice dependencies, recursive transformation, object transformation, property transformation and intermediate states. The whole example represents one branch of the process of transformation, as presented in FIG. 3b. This means the example does not show the different alternatives proposed at every step (e.g. intermediate states model instances 350 in FIG. 3b) but rather the initial SOA model (e.g. SOA model 310 in FIG. 3b), several intermediate state models (e.g. intermediate state models 355 and 365 in FIG. 3b) and the best SOI model instance (e.g. SOI model 369 in FIG. 3b). So the example presented in FIGS. 7-11 shows the path along the branches that leads to the best SOI model instance. Starting at FIG. 7, the transformation is initialized. This is the first step 760 of the recursive pattern recognition. Because a tight coupling is detected on the intra-service level, the applied tight coupling pattern suggests a combination of both SOA component requirements 730 and 735 into one service requirement 750. Thus, components AA 710 and AB 720 are combined in the first step 760 of the transformation. At the next recursive pattern recognition step 800, shown in FIG. 8, a RAM/Computing power pattern 810 is detected. The properties of RAM/Computing power on SOA level are transformed to the corresponding properties RAM/CPU on SOI level. The applied RAM/Computing power pattern accesses the performance database and suggests grid structure with 66% efficiency interconnect grid 820 by analyzing the current state of the art hardware parts. Based on this suggestion, current available CPU/RAM pieces 830 are selected. In alternative transformations, the suggested grid structure by the performance database may be, for example, 50% or 75% efficiency interconnect grid. Such suggestions would trigger different CPU/RAM pieces to be selected. FIG. 9 represents the next recursive pattern step 900. In this step 900, the intermediate state of an "unknown" motherboard is transformed to a known selected motherboard XY 910 from the performance database. The parts of these selected motherboards, together with other properties on SOI level such as a server housing, slots and network adapters 920 are also inserted. Here different alternatives might appear if the performance database proposes several variants for motherboards. Even motherboards with the same metrics but different manufacturer (trade mark) would cause the creation of several alternative intermediate state model instances. The next recursive step 1000, presented in FIG. 10, shows the step of network pattern recognition 1010. The intermediate states are combined and transformed to SOI level network adapters and links 1020. Furthermore, a concrete server rack 1030 and switch 1040 are selected from the performance database. Finally, FIG. 11 shows the step 1100 of analyzing the created SOI model instance in step 1000, by the business engine. The business engine confirms that step 1000 model is best suited 1110. This defines the step 1000 model as the best SOI model instance. Additionally, the business engine could access its business value database to find, for example, that the SOI infrastructure provider runs a server farm, which is not fully loaded. Based on this information, a deployment of the service on this server farm is suggested by the business engine 1120.

Figure 12:
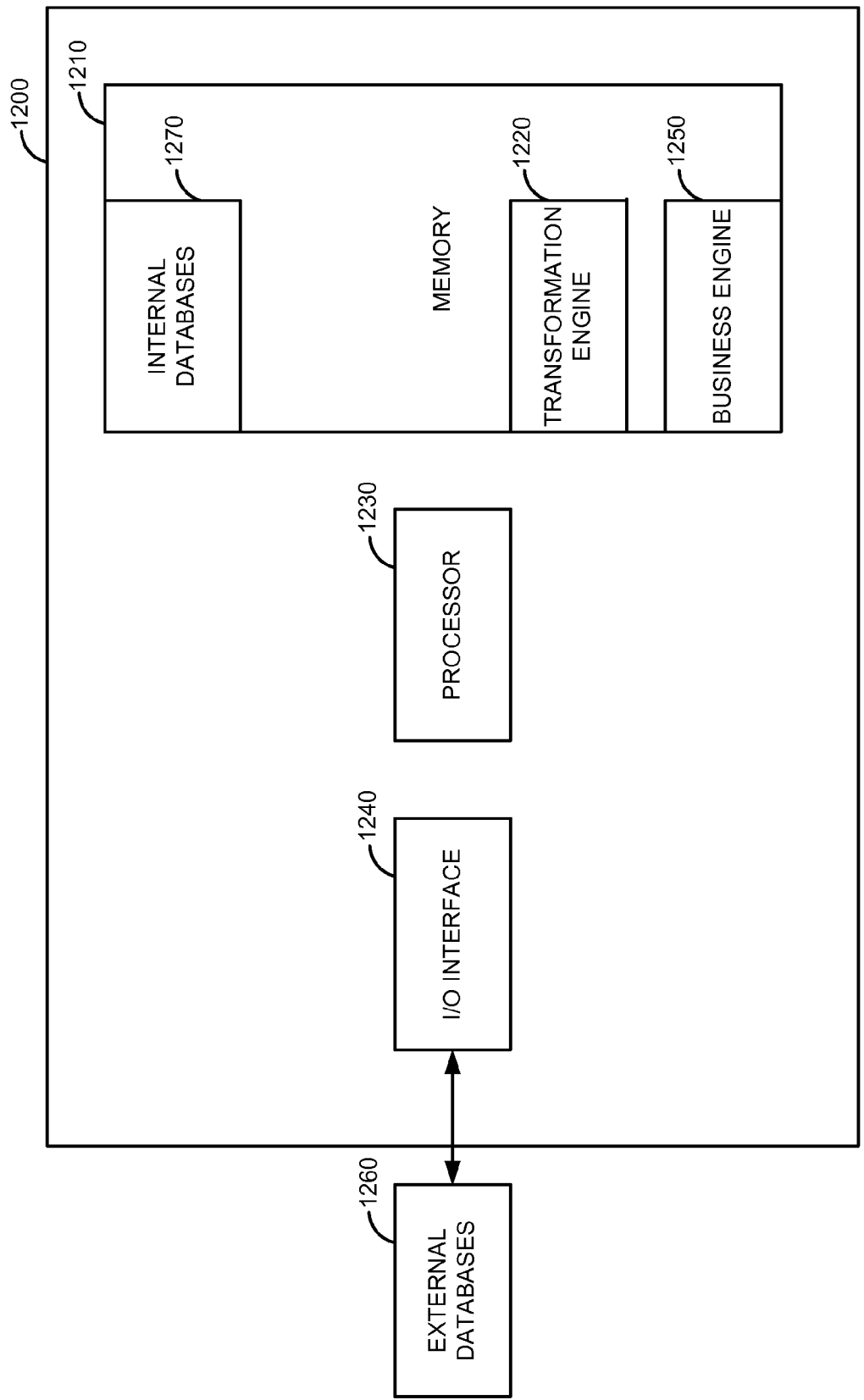
FIG. 12 is a block diagram of an embodiment of the invention for a computer system for SOA to SOI transformation.

FIG. 12 is a block diagram of an embodiment of the invention for a computer system 1200 for SOA to SOI transformation. The computer system 1200 incorporates a memory 1210, a processor 1230 and an I/O interface 1240. The memory 1210 encompasses internal databases 1270, a transformation engine 1220 and a business engine 1250. The transformation engine 1220 is used to transform a SOA model into a SOI model. The transformation engine 1220 performs the transformation by accessing a used case database that provides known transformable patterns for SOA to SOI transformation. The used case database is residing either at the internal databases 1270 or the external databases 1260. The external databases are connected to the computer system 1200 by means of the I/O interface 1240. The transformation engine 1220 is supported by the business engine 1250 with business analyzing features. In one embodiment, the transformation engine 1220 and the business engine 1250 perform the transformation by using data from a performance database that provides properties of available hardware parts for the SOI model. The performance database may reside either at one of the internal databases 1270 or the external databases 1260. In one embodiment, the transformation engine 1220 and the business engine 1250 perform the transformation by using data from a business value database that provides historical information, cost facts and efficiency data for business analyzing feature. The business value database may reside either at one of the internal databases 1270 or the external databases 1260. In one embodiment, a recognition agent (not shown) may be part of the computer system 1200 in order to serve sophisticated pattern recognition methods based on hierarchical case-based reasoning system approaches. In one embodiment, a transformation agent (not shown) may be used in order to transform a single recognized pattern and create an updated SOI model instance, which may be intermediate or final for the transformation, depending on the availability of other transformable patterns in the updated SOI model instance. In one embodiment, the business value database is fed with business data by a business agent (not shown). In one embodiment, a real time monitoring and analyzing (RTMA) agent (not shown) is used to provide data for the performance database.

An embodiment of the present invention relates to a computer storage product with a computer readable medium having computer code thereon for performing various computer-implemented operations. The media and computer code may be those specially designed and constructed for the purposes of the present invention, or they may of the kind well known and available to those having skill in the computer software arts. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine executable software instructions.

The foregoing description, for purposes of explanation, used specific nomenclature to provide a thorough understanding of the invention. However, it will be apparent to one skilled in the art, that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and the equivalents define the scope of the invention.

What is claimed is

1. A non-transitory computer readable medium comprising computer readable instructions, which, when executed by a computer, causes the computer to perform a method, comprising:
   receiving a service oriented architecture model instance;
   detecting a pattern in the service oriented architecture model instance that is transformable according to at least one used case of a used case database, the used case database comprising one or more used cases of previously transformed patterns;
   transforming the detected pattern according to the at least one used case to create at least one intermediate state model instance;
   detecting a pattern in the at least one intermediate state model instance that is transformable according to at least one other used case of the used case database and transforming the detected pattern according to the at least one other used case to create one or more lower intermediate state model instances;
   detecting and transforming patterns of the lower intermediate state model instances until the lower intermediate state models are no longer transformable according to used cases of the used case database;
   storing the no longer transformable lower intermediate state models as one or more alternative instances defined for of service oriented infrastructure models corresponding to the received service oriented architecture model instance;
   comparing the one or more alternative instances defined for the service oriented infrastructure models according to dynamic performance and business data analysis based on real time performance information and on-demand reports, wherein the on-demand reports comprise bottleneck analysis reports and cost reports; and
   based on the comparison, selecting one service oriented infrastructure model from the one or more alternative instances defined for the service oriented infrastructure models.

2. The computer readable medium of claim 1, wherein detecting a pattern that is transformable according to at least one used case of the used case database is performed at one or more transformation levels to recognize patterns.

3. The computer readable medium of claim 2, wherein the one or more transformation levels to recognize patterns include a property level, object or class level, inter-service level, and intra-service level.

4. The computer readable medium of claim 1, wherein the used cases that are able to transform a detected pattern differ from each other by one or more of the used transformation algorithms, transformation algorithm parameters, performance parameters, and business parameters.

5. The computer readable medium of claim 4, wherein the performance parameters alternate depending on static performance data of available hardware parts for the intermediate state model instances.

6. The computer readable medium of claim 4, wherein the business parameters comprise costs and benefits estimation.

7. A computerized method for service oriented architecture to service oriented infrastructure transformation executing on a processor, the method comprising:
   receiving a service oriented architecture model instance;
   the processor detecting a pattern in the service oriented architecture model instance that is transformable according to at least one used case of a used case database, the used case database comprising one or more used cases of previously transformed patterns;
   the processor transforming the detected pattern according to the at least one used case to create at least one intermediate state model instance;
   the processor detecting a pattern in the at least one intermediate state model instance that is transformable according to at least one other used case of the used case database and transforming the detected pattern according to the at least one other used case to create one or more lower intermediate state model instances;

the processor detecting and transforming patterns of the lower intermediate state model instances until the lower intermediate state models are no longer transformable according to used cases of the used case database;

the processor storing the no longer transformable lower intermediate state models as one or more alternative instances defined for service oriented infrastructure models corresponding to the received service oriented architecture model instance;

the processor comparing the one or more alternative instances defined for the service oriented infrastructure models according to dynamic performance and business data analysis based on real time performance information and on-demand reports, wherein the on-demand reports comprise bottleneck analysis reports and cost reports; and based on the comparison, the processor selecting one service oriented infrastructure model from the one or more alternative instances defined for the service oriented infrastructure models.

8. The method of claim 7, wherein detecting a pattern that is transformable according to at least one used case of the used case database is performed at one or more transformation levels to recognize patterns.

9. The method of claim 8, wherein the one or more transformation levels to recognize patterns include a property level, object or class level, inter-service level, and intra-service level.

10. The method of claim 7, wherein the used cases that are able to transform a detected pattern differ from each other by one or more of the used transformation algorithms, transformation algorithm parameters, performance parameters, and business parameters.

11. The method of claim 10, wherein the performance parameters alternate depending on static performance data of available hardware parts for the intermediate state model instances.

12. The method of claim 10, wherein the business parameters comprise costs and benefits estimation.

13. A computer system for service oriented architecture to service oriented infrastructure transformation, comprising:

one or more memory devices, the memory devices having stored thereon instructions related to:

a transformation engine operable to transform a service oriented architecture model to a service oriented infrastructure model, wherein the transformation engine is further operable to:

store the no longer transformable lower intermediate state models as one or more alternative instances defined for service oriented infrastructure models corresponding to the received service oriented architecture model instance;

compare the one or more alternative instances defined for the service oriented infrastructure models according to dynamic performance and business data analysis based on real time performance information and on-demand reports, wherein the on-demand reports comprise bottleneck analysis reports and cost reports; and select one service oriented infrastructure model from the one or more alternative instances defined for the service oriented infrastructure models; and a business engine, operable to perform the dynamic performance and the business data analysis based on the real time performance information and the on-demand reports;

a processor in communication with the memory and operable to execute the instructions in the memory related to the transformation engine and the business engine;

a used case database to provide a set of known transformable patterns for the service oriented architecture to service oriented infrastructure transformation;

a performance database to provide properties of available hardware parts for the service oriented infrastructure model; and a business value database comprising historical information, cost facts and efficiency data for business analyzing features.

14. The computer system of claim 13, further comprising a recognition agent to serve pattern recognition methods based on hierarchical case-based reasoning approaches.

15. The computer system of claim 13, further comprising a business agent to provide business data for the business value database.

16. The computer system of claim 13, further comprising a real time monitoring and analyzing agent to provide data for the performance database.

* * * * *